Patented Mar. 23, 1937

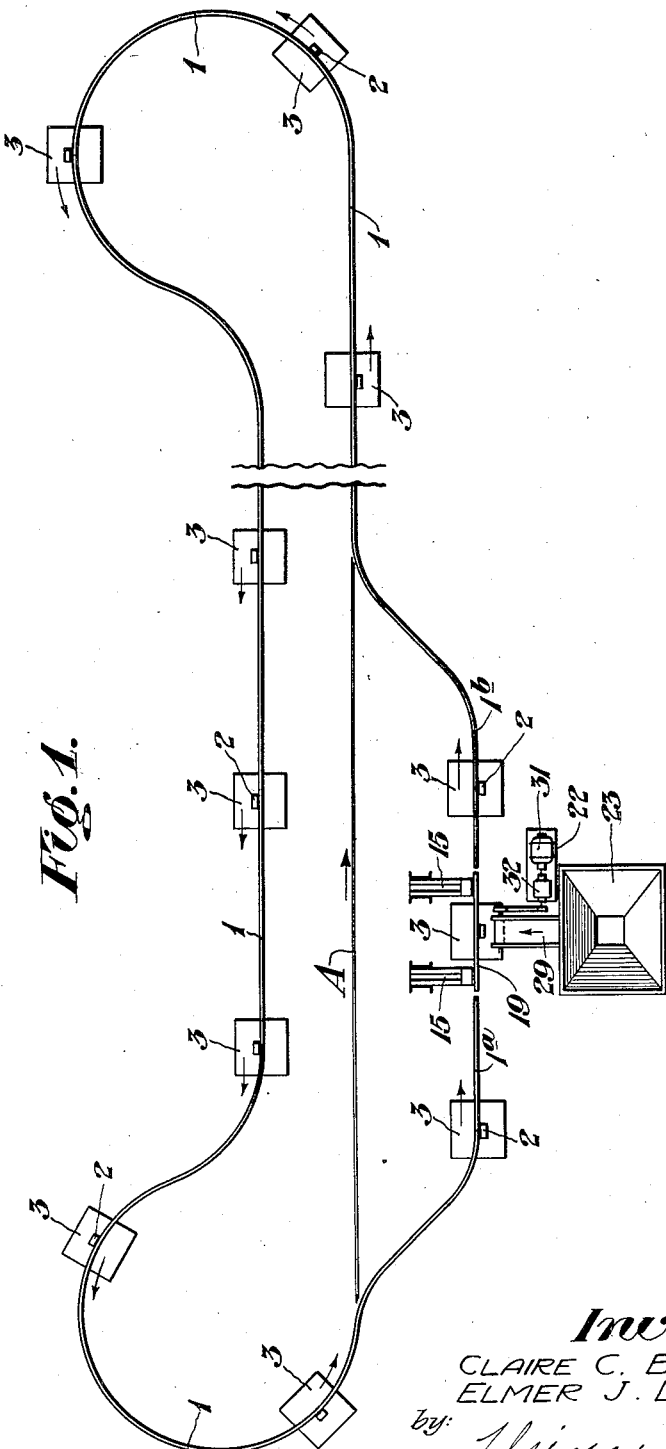

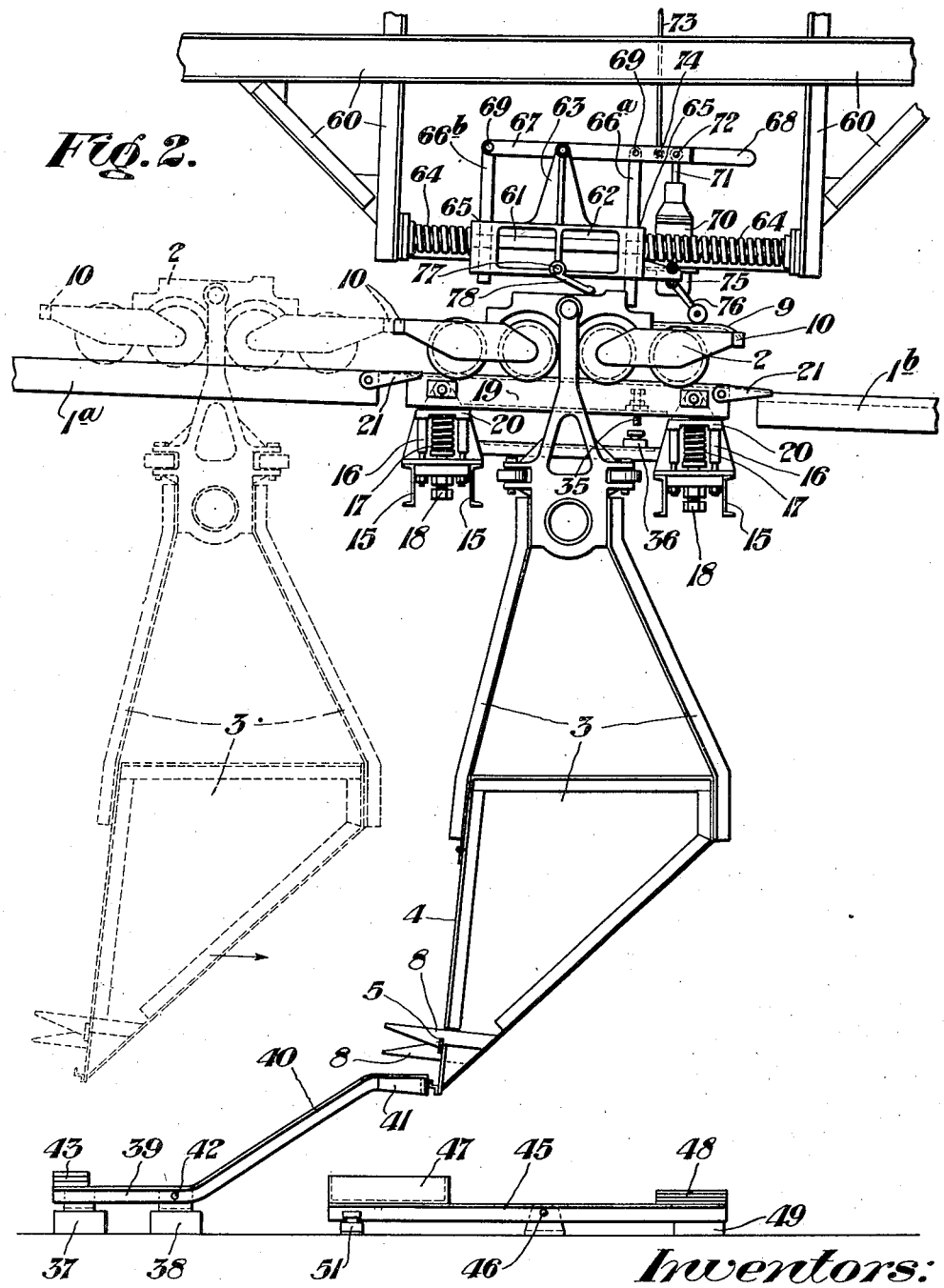

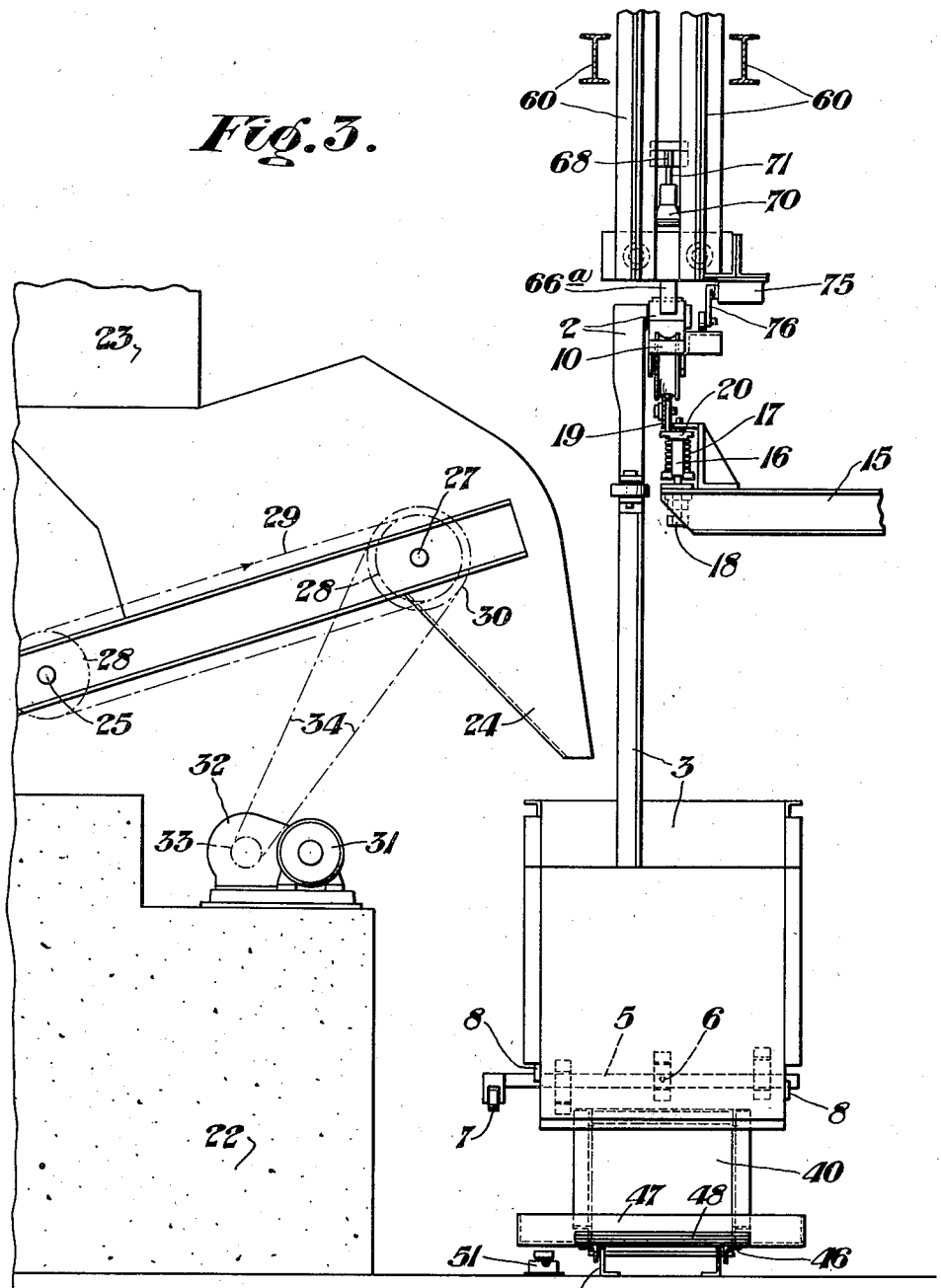

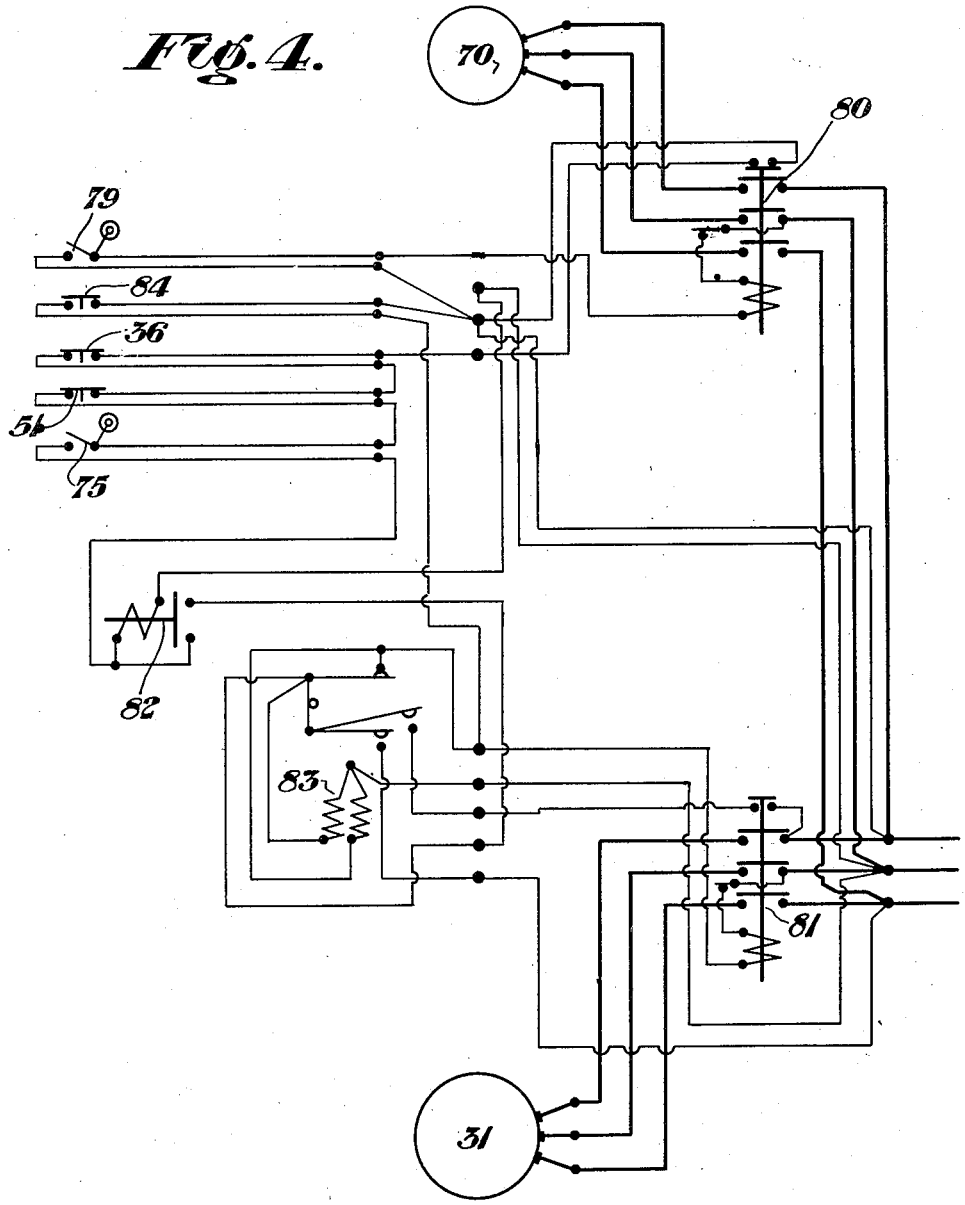

2,074,953

UNITED STATES PATENT OFFICE 2,074,953

AERIAL TRAMWAY

Claire C. Beatty and Elmer J. Lloyd, Worcester, Mass., assignors to The American Steel and Wire Company of New Jersey, a corporation of New Jersey Application August 14, 1934, Serial No. 739,831

1 Claim. (Cl. 214—41)

This invention relates to aerial tramways, and more particularly to those employing a continuous overhead trackway and an endless tramway cable having a plurality of carriages attached thereto at spaced intervals.

Aerial tramways of the class described are made to extend over a considerable length and are provided with one or more unloading stations, together with a loading station on a siding which deviates from the endless continuously driven tramway cable. The various carriages attached to the cable have carriers pivotally attached thereto. As the carriages approach the incoming tracks of the siding of the loading station, the connection of the carriage with the endless tramway cable is broken and it moves by gravity over a graded track to the loading station, where it is detained, loaded, and released, after which it moves by gravity over the outgoing track of the loading station and back to a position adjacent the cable to which it is automatically attached.

A tramway of this type is disclosed in United States Patent No. 1,760,077, to Morrison, dated May 27, 1930, together with the specific manner in which the carriages are connected and disconnected to the endless tramway cable, and is used in combination with a novel "dispatcher" or bucket spacing mechanism arranged at the loading station, where the material to be conveyed is loaded into the carriers from an adjacent storage bin. While generally efficient in operation, aerial tramways of this type present numerous difficulties which give rise to a considerable waste of time and money, if extreme vigilance is not maintained over the conveyer and other equipment at the loading station.

One object of the present invention is the provision of a novel aerial tramway having means for automatically detaining a carriage at the loading station, automatically actuated means for initiating the operation of the loading conveyer, and automatically actuated means for stopping said loading conveyer and permitting the carriage to move by gravity from the loading station and back to the tramway cable.

Another object is the provision of a novel aerial tramway of the type described having means for automatically closing the discharge doors of the various carriers as they are brought into position adjacent the loading conveyer, together with automatically actuated means for detecting the possible failure of the door closing means and discontinuing the operation of the loading conveyer.

The foregoing and further objects will be apparent after referring to the drawings, in which:

Figure 1 is a plan of part of the novel apparatus of the invention together with the conveyer to which it is applied.

Figure 2 is a side elevation of part of the apparatus.

Figure 3 is an end elevation.

Figure 4 is a wiring diagram for operating the electrical devices for the apparatus of Figures 1, 2 and 3.

Referring more particularly to the drawings, the letter A designates a continuously driven tramway conveyer cable extending over a comparatively long distance and having detachably connected thereto a plurality of conveyer carriages. An overhead track 1 is made to adjacently parallel the greater portion of the continuously driven cable A, and is provided with a deviating portion in order that a loading station may be established. That portion of the track which deviates from the cable to the loading station is indicated at 1ª, while the outgoing track from the loading station back to the tramway cable is indicated at 1ᵇ.

The track 1 is suitably graded, in order that the various carriages may be automatically detached prior to traveling over the incoming track 1ª of the loading station, and be permitted to move by gravity down the outgoing track 1ᵇ and become automatically attached to the cable A, as described in the Morrison patent previously mentioned. Conventional types of graded rails and braking devices may be used, but as such form no part of the present invention, and accordingly are neither shown nor described.

Each of the various carriages 2 pivotally supports a carrier 3 which is provided with a discharge door 4. Each of the discharge doors 4 has a latch bar 5 which is pivoted at 6. The latch bars 5 are each provided with a roller 7 on one of their ends which is utilized to automatically trip the latch bar and permit the discharge door to open at a suitable unloading station. A pair of latches 8 cooperate with each of the latch bars 5 to hold the doors 4 in closed position.

A tripper shoe 9 is secured to the upper portion of each of the carriages 2, and a bumper 10 mounted on each of their ends.

The incoming track 1ª and outgoing track 1ᵇ, forming the loading siding, are separated in such manner as to provide a substantial opening therebetween. A pair of supporting structures 15 are provided one adjacent the end of each of the tracks 1ª and 1ᵇ, and each supports a cage 16 in which a spring 17 is mounted. The springs 17 may be adjusted to varying degrees of compression by means of adjusting screws 18.

A short track section 19 is disposed in the opening between the tracks 1ª and 1ᵇ, and provided with a pressure plate 20 adjacent each of its ends which is adapted to make contact with one of the cages 16 for the springs 17. A pair of hoods 21 are provided for spanning the spaces between the tracks 1ª and 1ᵇ and the ends of the track section 19, one being secured to the end of the incoming rail 1ª and adapted to pivot in such manner as to constantly engage one end of the track section 19, while the other hood 21 is pivoted to the other end of the track section 19 and adapted for constant engagement with the end of the outgoing rail 1ᵇ of the loading station.

A suitable foundation 22 is disposed adjacent the spring-mounted track section 19, and supports a storage bin 23 having a discharge chute 24. A pair of shafts 25 and 27 are suitably journaled in the storage bin 23 and discharge chute 24, respectively, and each provided with a roll 28, around and between which an apron type conveyer belt 29 is mounted. A pulley 30 is secured to the shaft 27 and receives rotation from a motor 31, through a gear reduction unit 32, pulley 33, and a connecting belt 34.

An adjustable plunger 35 is secured to the spring-mounted track section 19 in such manner as to be disposed over a push-button switch 36 which is mounted between the supports 15, and serves to discontinue the operation of the motor 31 for the apron type conveyer belt 29 when the spring-mounted track section 19 is sufficiently depressed from the increasing weight in the carrier 3.

In order to assure the seating of the latch bar 5 in the latches 8, on each of the carriers 3, and accordingly completely close and fasten their doors 4, a pair of blocks 37 and 38 are disposed beneath the spring-mounted track section 19. A plate 39 is provided with a diagonally upward extending portion 40, having a flattened extremity 41, and pivoted to the block 38, as at 42. Counterweights 43 are disposed on the end of the plate 39 which is remote from the diagonally upward extending portion 40 and adjacent the block 37 upon which it rests.

As each of the carriers 2 moves from the incoming track 1ª of the loading station and onto the spring-mounted track section 19, the bottom of its carrier 3 will engage the diagonally upward extending portion 40 of the plate 39 and rock it about the pivot 42. The carriage 2 is stopped on the spring-mounted track section 19, in a manner to be later described, and the carrier 3 will swing about its pivotal mounting on the carriage and make contact with the flattened extension 41 of the diagonally upward extension 40, which has been moved back into its initial position by the counterweights 43. The impact of the door 4 of the carrier against the plate 39 will force the latch bar 5 to seat in the latches 8, if for some reason it has not done so previously. However, to completely provide against the operation of the motor 31, for driving the apron type conveyer belt 29, if the impact of the door 4 against the flattened extension 41 of the plate 39 fails to completely close and fasten the same, a table 45 is disposed directly beneath the spring-mounted track section 19 and pivoted adjacent its mid-portion, as at 46. A tray 47 is mounted on the end of the table 45 which is beneath the flattened extension 41 of the plate 39, and counterweights 48 disposed on the other end thereof. A spacer block 49 is disposed beneath the counterweighted end of the table 45 to maintain it in substantially horizontal position. A switch 51 is disposed beneath the end of the table 45 on which the tray 47 is mounted.

If, for any reason, the discharge doors of any of the carriers 3 fail to close themselves by impact against the extension of the tilting plate 39, and the motor 31 for driving the apron type conveyer belt 29 continues to operate and discharge material into the carrier, it will spill through the open door 4 and be deposited in the tray 47, which will soon cause the counterweights 48 to be overbalanced and the plate 45 to be depressed in such manner as to cause the push-button 51 to immediately break the circuit to the motor, and thus discontinue the operation thereof.

A superstructure 60 is arranged over the spring-mounted track section 19 and adapted to support a "dispatcher" or bucket spacing mechanism of the type of the Morrison patent referred to. This dispatcher is in general carried by a pair of horizontally disposed rods 61. A housing 62 is mounted on the substantial mid-portions of the rods 61 and provided with an extension 63. A spring 64 is mounted on each end of the rods 61 and between the sides of the housing 62 and the supporting superstructure. The housing 62 is apertured adjacent each of its ends as at 65, and each aperture provided with a shaft extending therethrough, as at 66ª and 66ᵇ. A walking beam 67 is pivoted on the upper extremity of the vertical extension 63 of the housing 62 and provided with an extension 68. The rods 66ª and 66ᵇ are pivotally connected, as at 69, to the walking beam 67. A "thrustor motor" 70 is mounted on the superstructure 60 adjacent the shaft 66ª, and provided with a rod 71 which is adapted to be extended upon the energization thereof. The rod 71 is pivotally connected to the extension 68 of the walking beam 67, as shown at 72.

The walking beam extension 68 is suitably weighted to provide sufficient resistance to cause the rod 71 of the "thrustor motor" 70 to return to its normal position. A rod or "hand rope" 73 is connected to the extension 68, as shown at 74, to enable the dispatcher to be operated manually in an emergency. A switch 75 is mounted on the housing 62 and provided with a switch arm 76 which is adapted to engage the tripper shoes 9 on the various carriages 2. The function of this switch 75 is to initiate the operation of the motor 31 for the loading conveyer.

An arm 78 is pivoted, as at 77, to the bottom of the housing 62 for the purpose of "checking" the rebound set up by the bumpers 10 on the carriages 2.

Referring to Figure 4, there is disclosed a diagrammatic layout of electrical adjuncts for the various devices of the invention.

In operation, a carrier 2 is disengaged from the continuously driven tramway cable A, progresses by gravity over the incoming track 1ª of the loading station, and moves onto the spring-mounted track section 19. On the track section 19 it engages the shaft 66ª in the housing 62, which has been so positioned by the weighted extension 68. At the same time, the tripper shoe 9, attached to the upper portion of the carriage 2, actuates the switch 75 through its arm 76, closing the circuit of the motor 31, for driving the apron type conveyer belt 29, through a magnetic switch 81. The starting of the motor 31 is delayed by time delay relay 82 for a predetermined interval, in order that the swing of the tramway carrier 3, caused by the abrupt halt of the carriage 2, may be retarded.

As before stated, the rearward swing of the tramway carrier 3 will permit it to come in contact with the flattened portion 41 on the diagonally upward extension 40 of the tilting plate 39, over which it has just passed, and the impact will cause the pivoted latch 5 to seat in the latches 8 and thus assure the closure of the door 4. The movement of the apron type conveyer belt 29 on the rolls 28, put in motion by the motor 31, moves the material to be conveyed from the bin 23 and into its discharge chute 24, from which it drops into the carrier 3. The spring-mounted track section 19 is gradually depressed against the resistance of the spring 17 as the carrier is loaded, and finally the plunger 35, which is adjustably attached to the track section 19, engages the push-button switch 36 which is connected to the supporting structure 15, thereby disconnecting the motor 31 causing the forward movement of the apron type conveyer belt 29 to be stopped, thus cutting off the flow of material into the carrier 3.

During the time the motor 31 for the conveyer belt 29 is actuated, a definite time delay relay 83 is also set in operation, and will stop the motor 31 after a predetermined interval which is, in practice, a few seconds longer than the actual time required for loading the carrier 3. This operation eliminates excessive spillage from the conveyer belt 29 in the event that the push-button switch 36 fails to function when the carrier 3 is fully loaded.

If, for any reason, the door 4 of the carrier was not closed when the carriage 2 came to rest on the spring-mounted track section 19, and the material being loaded escapes therethrough, it will fall into the spillage tray 47 on the tilting table 45, and cause the latter to depress the push-button switch 51, which will disconnect the motor 31 and cause the conveyer belt 29 to stop.

After the motor 31 is stopped, the subsequent action of the loaded carrier 3 and carriage 2 is controlled by the automatic bucket spacing mechanism as described in United States Patent No. 1,760,077, which in general is as follows: At the proper time interval the circuit to the thrustor motor 70 is closed, through a magnetic switch 80, by the limit switch 79 which is operated by a cam mounted on a sheave shaft, so as to be rotated only when the cable A is being operated. When the thrustor motor 70 is thus energized it causes the rod 71 to rise and lift the shaft 66$^a$, thereby releasing the loaded carriage 2. At the same time the shaft 66$^b$ is lowered, thus restraining the empty carriage 2 from entering on the spring-mounted track section 19 until the loaded carriage 2 has had time to clear the track section 19. This method eliminates the possibility of having the empty carriage 2 run through the dispatcher before the shaft 66$^a$ has been lowered. When the proper time interval has elapsed the circuit to the thrustor motor 70 is broken by the cam, mounted on the sheave shaft, thus permitting the rod 71 to be lowered by the action of the weighted extension 68. This lowers the shaft 66$^a$ and raises the shaft 66$^b$, permitting the empty carriage 2 to enter on the track section 19, where the loading cycle, as previously described, is repeated. The loaded carriage 2, thus released, runs by gravity from the track section 19 to the track siding 1$^b$, which is graded the proper amount to enable the speed of the carriage 2 to be accelerated until it closely approximates the speed of the moving cable A, and is then automatically attached thereto.

An emergency push-button switch 84 is provided in the circuits for the controlling devices, and operates the motor 31 for the conveyer belt 29 independently of the automatically operated devices described.

The possibility of the simultaneous operation of the motor 31, for driving the loading conveyer 29, and the "thrustor motor" 70 for releasing the carriage in the loading station, is entirely eliminated by the interlocking of their circuits.

It is to be understood that other means may be used for operating the various devices of the invention in lieu of the electrical adjuncts and operating circuits disclosed, and that while we have shown and described one specific embodiment of our invention, it will be understood that we do not wish to be limited exactly thereto, since various modifications may be made without departing from the scope of our invention, as defined in the following claim.

We claim:

In an elevated tramway system, a loading station, a pivoted carrier, a pivoted discharge door on said carrier, and means at said loading station for closing said discharge carrier, said means comprising a pivoted table, an upward extension on one end of said pivoted table, and a weight on the other end of said pivoted table.

CLAIRE C. BEATTY.
ELMER J. LLOYD.